United States Patent

Roberts

[11] Patent Number: 5,873,522
[45] Date of Patent: Feb. 23, 1999

[54] WATER IRRIGATION SUPPORT

[76] Inventor: Raymond F. Roberts, 1012 Monastery Rd., Snowmass, Colo. 81654-9199

[21] Appl. No.: 841,223

[22] Filed: Apr. 29, 1997

[51] Int. Cl.$^6$ .............. B05B 17/00; B05B 3/12; F16L 3/00; F16L 3/08
[52] U.S. Cl. .............. 239/1; 239/741; 248/49; 248/74.1; 248/176.1
[58] Field of Search ............... 239/273, 276, 239/280, 289, 600, 741, 743, 749, 1; 248/49, 74.1, 176.1

[56] References Cited

U.S. PATENT DOCUMENTS

| | | |
|---|---|---|
| 2,045,336 | 6/1936 | Skoglund . |
| 2,392,110 | 1/1946 | Alexander ............... 248/49 X |
| 2,584,543 | 2/1952 | Brown . |
| 2,665,169 | 1/1954 | Tipton ..................... 239/741 |
| 2,694,600 | 11/1954 | Richey ................ 239/280 X |
| 3,202,172 | 8/1965 | Bergeron et al. ........... 239/741 X |
| 4,352,464 | 10/1982 | Cornelius et al. . |
| 4,452,398 | 6/1984 | Wheaton et al. . |
| 5,290,127 | 3/1994 | Foster et al. ............ 248/49 X |

FOREIGN PATENT DOCUMENTS

| | | |
|---|---|---|
| 246424 | 8/1963 | Australia . |
| 978565 | 11/1975 | Canada . |
| 2395418 | 1/1979 | France ................... 248/74.1 |

OTHER PUBLICATIONS

Product Brochure for Wade Rain®, Wade Mfg. Co., Portland, Oregon; date unknown.

Product Brochure for Pierce Side Wheel Roll, Pierce, Eugene, Oregon; Oct. 1, 1989.

*Primary Examiner*—Andres Kashnikow
*Assistant Examiner*—Steven J. Ganey
*Attorney, Agent, or Firm*—Andrew D. Sorensen; John R. Wahl; Holland & Hart

[57] ABSTRACT

A support apparatus for use on an above ground field irrigation system which supports an irrigation system pipe terminal end extension. The apparatus comprises a support post or stand which has a securing clamp ring at its upper end which is free to rotate about the pipe and secures the upper end of the stand to the terminal end of an irrigation system pipe. The apparatus supports the terminal end of an irrigation system pipe in an upright position when the stand is vertically beneath the terminal end as an alternative to a half-wheel or a full wheel at the terminal end.

8 Claims, 2 Drawing Sheets

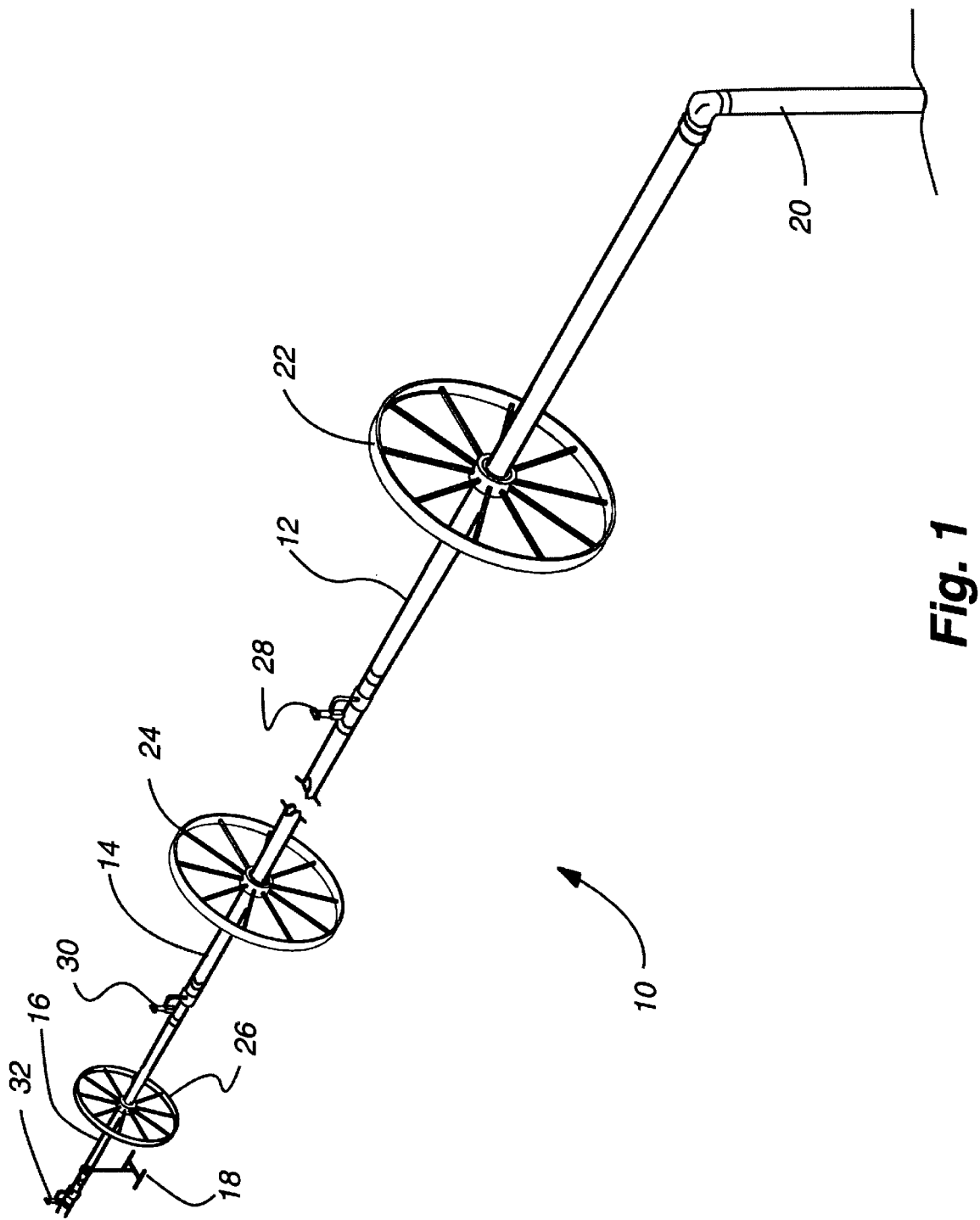

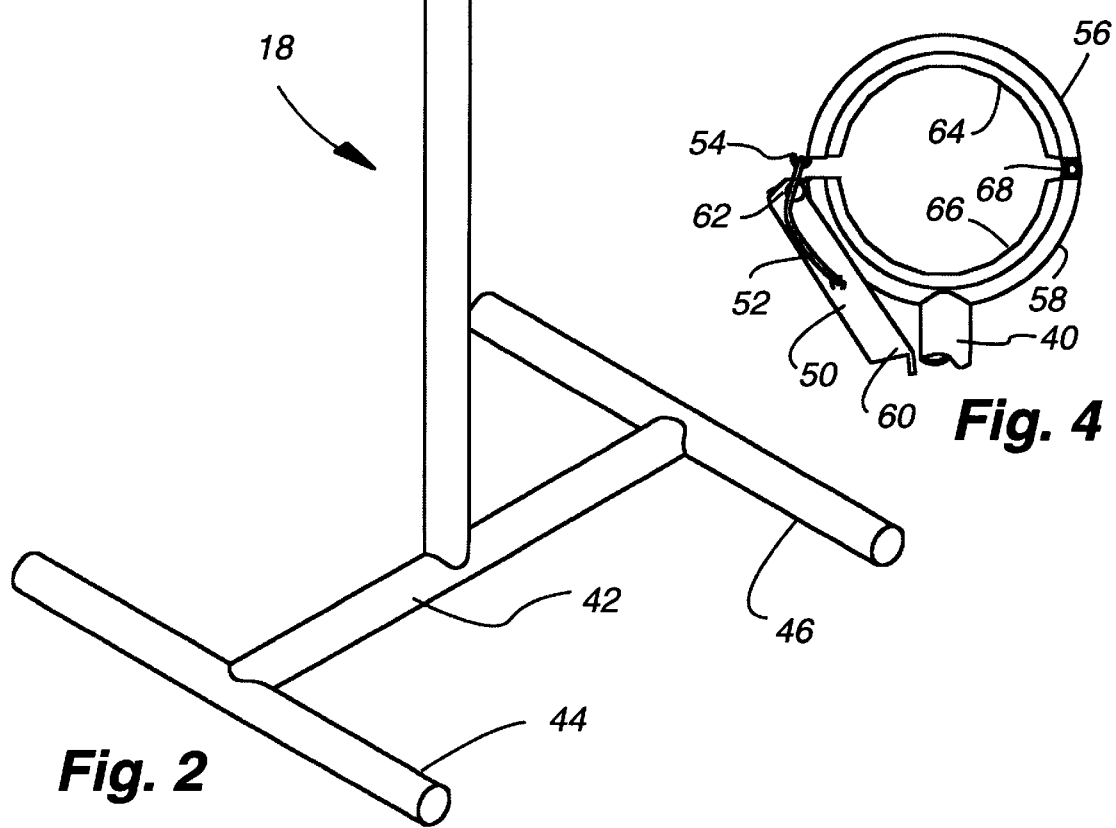

WATER IRRIGATION SUPPORT

FIELD OF THE INVENTION

Large irrigation systems for farms have been commonplace for a number of years. The present invention is directed to an apparatus which supports an irrigation system extension when in use.

BACKGROUND OF THE INVENTION

Irrigation systems have long been used to water vast tracts of land. Irrigation systems which have recently become widespread in use are the systems which utilize raised section of pipes which are supported by large wheels. There are two general types of systems. The first system irrigates in a 360 degree circle. In this system, there is typically a central point wherein the water is fed into the irrigation pipe, and from that central point a long linear pipe or hose with apertures therethrough extends oftentimes over 1,000 feet. The second type of system, which the present invention is directed to, is a linear system, which utilizes a series of hydrants. The hydrants are positioned in line, about every 60 feet. The linear section, which has aluminum sections of pipe, waters a fixed area for approximately 12 hours. After the area is watered, the linear section is disconnected from the hydrant and is moved to a new area of the field. The watering is thereafter resumed. On very large, flat tracts of land where there are minimal number of irregularities, such as trees, mountains, sharp hills, etc., the long sections may be moved in a linear direction thus watering vast tracts of land, typically approximately 40 acres of land. However, in farming regions wherein there are numerous hills, trees, rocky cliffs, etc., oftentimes the extension must be shortened for a portion of the tract which is to be watered. This involves taking out 40-foot sections and leaving them in the field until the irrigation system makes its pass past the irregularity. When the end piece is disconnected, a temporary half-wheel must be moved (usually dragged) out to where the end of the section where the end piece was disconnected from. Dragging this wheel is cumbersome in that it must be moved many feet. The half-wheel is used to support the section of pipe so it does not touch the ground and bend when water has filled the pipe section when the system is in operation.

There are many problems with the use of the half-wheel. The first is it is cumbersome to move across the field and place under the pipe section needing support. The second problem is that the wheel tends to get misplaced, since it is moved out and attached and removed so frequently. Yet another problem arises when the half-wheel needs to be returned to its first position when the side roll completes its cycle. The distance that the half-wheel may need to be moved back after irrigation has been completed may be a great distance.

Thus, there is a need for an apparatus which supports the end section of irrigation piping when it is not supported by a wheel.

SUMMARY OF THE INVENTION

The present invention is directed to a irrigation support leg which provides support to sections of side roll irrigation systems. In particular, the invention is a brace which provides an aperture wherein the brace may be secured to a section of the side roll irrigation system. The brace is allowed to rotate on the section, thus when the system is moved to a new position, the brace rotates and drags across the field. When the brace is in use, it may be clamped tightly and thus supports the terminal end of the irrigation system. By a slight reverse motion of the side roll power unit, the brake can be made to stand in an erect position automatically, thus providing an end support for either end of the side roll unit before water is introduced into the pipeline to irrigate the next section of the field.

BRIEF DESCRIPTION OF THE DRAWINGS

FIG. 1 is a schematic of the side roll irrigation system useful for the present invention.

FIG. 2 is a perspective view of the water leg support apparatus of the present invention.

FIG. 3 is a close-up view of the clamping mechanism used for the present invention shown in an open position.

FIG. 4 is a close-up view of the clamping mechanism used for the present invention shown in a closed position.

DETAILED DESCRIPTION OF THE PREFERRED EMBODIMENT

The present invention is generally directed to a support leg for disconnected portions of side roll irrigation systems. Side roll irrigation systems are used to irrigate vast tracts of land throughout the land. The side roll irrigation systems utilize sections of aluminum pipe which are connected to a water source. The sections of aluminum pipe have wheels secured to the pipe such that the pipes may be moved in a linear fashion. Side roll irrigation systems are designed to cover fields of approximately 40 acres. The fields are ideally rectangular or square in shape. However, many units must operate in fields that necessitate the dropping of one or more sections when encountering a surface irregularity such as mountains, hills, rocks, trees, etc. These sections, typically 40-foot sections of aluminum pipe, typically have one wheel at a mid-section, a sprinkler head at an end section, and a coupling section to secure the section to a pipe at one end or both ends.

FIG. 1 generally discloses an irrigation system 10 with multiple sections of pipes 12, 14 and 16. The water leg 18 will be described in detail below. Generally, a full-size roll unit is about a quarter of a mile or 1300 feet in length. The side roll irrigation system operates to irrigate a field by having a row of hydrants, each spaced about 60 feet apart. The unit is linear, and secured to the hydrant 20, with the 40-foot sections secured together. There are large wheels every 40 feet approximately. The large wheels, shown as 22, 24 and 26, are located at approximately the mid-section of the pipe sections. These large wheels are about six feet in diameter. Also, there is a sprinkler head on each section, shown as 28, 30 and 32. The sprinkler head is typically at the terminal end of each pipe section. There is also, optionally, a motorized power unit located along the line (not shown).

The unit 10 is hooked up to a hydrant 20, with the 40-foot sections secured together. After the unit is hooked up to the hydrant 20, water flows through the pipes, watering the field. After sufficient watering, the unit 10 is disconnected from the hydrant 20, and the motorized unit propels the linear unit down the field to the next hydrant. Thereafter watering begins in the new field area. When it is necessary that a section is dropped to accommodate the contour of the field, it is necessary to support the terminal end of the last piece 16 which is at the end opposite of the hydrant 20. If this terminal end 16 is not supported, it will tend to bend to ground level. This problem is compounded when the section of pipe is filled with water. This is due to the heavy weight of the water in the pipe. This is where the present invention comes into play.

As is shown in FIG. 2, the present invention 18 is generally called a brace or support or water leg. The use of this device can save time and also prevent damage to the pipe. The brace 18 can be secured to the pipe at all the various junctures, and thus travels up and down the field in either direction without being detached.

The brace 18 of the present invention can be any type of stand which has sufficient strength to support an end section of aluminum pipe filled with water. This brace or support 18 must have some type of aperture 19 which his large enough to allow a section of an irrigation pipe to extend therethrough. In the preferred embodiment, as shown in FIG. 2, the brace has a vertical section 40 and a base section 42 which is substantially perpendicular to said vertical section 40. Preferably, the horizontal base has two legs 44 and 46 extending from a middle section 42. However, the horizontal base 42 may be circular, radial, or any other configuration which provides support to the vertical section when supporting an extension of pipe.

The vertical bar 40 may be a single vertical bar or have a plurality of bars. The cross-sectional profile may be circular, rectangular, square, triangular or any other shape which provides sufficient support strength to the irrigation system.

Typically, the radius of the irrigation pipe is approximately 4 to 5 inches. As is evident in FIG. 4, there is a clamp 48 atop the brace 18 of the present invention. The clamp 48 may be opened such that it may be secured to the irrigation pipe as shown in FIGS. 3 and 4.

Clamp 48, as shown in FIG. 3, may be configured in many ways, however, the preferred embodiment is shown in FIGS. 3 and 4. Essentially, any clamp which may be secured to an irrigation system pipe is useful. If the irrigation system pipe happens to has a different cross-sectional shape than circular, the clamp may be adjusted accordingly. However, in the preferred embodiment, wherein the irrigation pipe is circular, an over-center clamp is shown in the figures. Typically, this over-center clamp is attached to the vertical bar 40 and has two half sections 56 and 58 which open and close. Preferably, the half section located atop, 56, pivots at a pivot point 68. FIG. 3 illustrates the clamp in the open position. This clamp has a lever 50 with a swinging gate or bale 52. The lever is preferably rotatably secured to top member 56 via pivot point 62. The rotatable bale 52 is typically relatively thick gauge wire which makes a loop. This loop is configured such that it may engage member 54. Lever 50 may also have a finger grasp 60 such that the lever may be opened easily.

The clamp is configured as an over-center clamp such that when arm 50 is extended downwardly such that bale 52 engages member 54, and arm 50 is pulled back towards top member 56, bale 52 tightens, but allows arm 50 to close completely, as shown in FIG. 4. Any other type of clamp mechanism can be used, including a bolt with a wing nut, magnetic clamp, or any other type of means which would secure the brace to the irrigation pipe. Additionally, a flexible resistant foam liner may be applied on the inward surface, as shown as 64 and 66. This may prevent the brace from scratching the aluminum pipe.

With regard to the size of the aperture 19, it must be big enough such that the brace may be rotated from side to side while secured on the aluminum pipe. This is the preferred embodiment, such that when the irrigation pipe is moved from one section of the field to the other, the brace will rotate slightly and drag along the ground. Once the position is located where the next watering will occur, the brace is rotated such that the vertical bar 40 is essentially perpendicular with the field. It is now in its supporting mode, rather than the traveling mode, when the brace is being dragged. The present invention could be utilized wherein the brace does not rotate on the aluminum pipe, but is secured tightly. However, this is not preferred in that it is easier if the brace can rotate about the irrigation pipe, such that when the irrigation pipe is moved in either direction, either member 44 or 46 is actually dragging on the ground with the water leg slightly askew.

It is understood that while the invention has been described above in conjunction with the preferred method and preferred embodiment, the description and examples are intended to illustrate but not limit the scope of the invention, which is defined by the scope of the following claims.

I claim:

1. An apparatus which is useful for irrigating fields with water, said apparatus comprising:

a) a water irrigation system, said irrigation system comprising a plurality of pipes for carrying water supported generally parallel to a field section to be irrigated, said pipes having connectable ends, a plurality of wheels supporting said pipes above said field, said wheels situated on said pipes such that said pipes may be moved from one section of a field to another section of a field by rotating at least one of said wheels, said irrigation system having a hydrant end having means to secure to a water source, said irrigation system having a terminal end opposite said hydrant-end; and b) an irrigation support having a first and second end, said irrigation support first end having a means to releasably secure said irrigation support to said terminal end of said irrigation system so that said support is free to rotate about said terminal end of said irrigation system during movement of said irrigation system over said field, the second end of said support being secured to said first end via a vertical support member, said vertical support member in combination with said second end having sufficient strength to support said terminal end of said irrigation system above said field, said second end of said support having structure such that said support may stand vertically thereby elevating and supporting said terminal end of said irrigation system above said field.

2. The apparatus of claim 1 wherein said securing means is an over-center clamp having an inner diameter greater than an outer diameter of said terminal end of said irrigation system.

3. The apparatus of claim 1 wherein said second end of said support includes a base with radial elements extending from said vertical support to said base.

4. The apparatus of claim 1 wherein said second end of said support has a center bar secured to said vertical support member, said center bar having opposite ends, each end terminating in a transverse bar substantially perpendicular to said center bar and substantially perpendicular to said vertical support member to provide stability to said support.

5. A method for moving an irrigation system used for irrigating fields with water, said water irrigation system comprising a plurality of pipes for carrying water, said pipes having connectable ends, a plurality of wheels, said wheels situated on said pipes such that said pipes may be moved from one section of a field to another section of a field, said irrigation system having a hydrant end having means to secure to a water source, said irrigation system having a terminal end opposite said hydrant end, said method comprising;

a. placing an irrigation support on said terminal end of said irrigation system, said irrigation support having a first end having a means to releasably secure said irrigation support to said terminal end of said irrigation system, said secure means allowing said support to rotate about said terminal end of said irrigation system during movement of said irrigation system;

b. moving said irrigation system to a new location in the field by rotating at least one of said wheels, said movement dragging said irrigation support along with said terminal end;

c. positioning said irrigation support under said terminal end such that said irrigation support is substantially perpendicular to said field, said irrigation support providing support to said terminal end of said irrigation system.

6. The method of claim 5 wherein said step of positioning comprises rotating said at least one wheel to move said system to a position beyond a desired field position and then rotating said at least one wheel back to the desired field position to move said irrigation support to a support position substantially upright beneath said terminal end.

7. The method of claim 5 wherein said support has a second end spaced from said first end by a vertical support member, said second end forming a base with radial elements extending from said vertical support to said base and said step of moving rotates said support from a vertical support position under said terminal end.

8. The method of claim 5 wherein said support has a second end including a pair of spaced horizontally extending bars for contacting said field, wherein one of said bars contacts said field during said step of moving and both of said bars contact said field to provide support to said terminal end of said irrigation system.

* * * * *